(12) United States Patent
Mayoraz

(10) Patent No.: US 9,341,182 B2
(45) Date of Patent: May 17, 2016

(54) ELECTROMAGNETIC PUMP

(71) Applicant: Gotec SA, Sion (CH)

(72) Inventor: Pierre Mayoraz, Sion (CH)

(73) Assignee: GOTEC SA, Sion (CH)

( * ) Notice: Subject to any disclaimer, the term of this patent is extended or adjusted under 35 U.S.C. 154(b) by 342 days.

(21) Appl. No.: 13/826,999

(22) Filed: Mar. 14, 2013

(65) Prior Publication Data
US 2013/0272908 A1 Oct. 17, 2013

Related U.S. Application Data

(60) Provisional application No. 61/622,617, filed on Apr. 11, 2012.

(51) Int. Cl.
| F04B 53/12 | (2006.01) |
| F16K 15/02 | (2006.01) |
| F04B 17/04 | (2006.01) |

(52) U.S. Cl.
CPC ............ *F04B 53/125* (2013.01); *F04B 17/044* (2013.01); *F04B 17/046* (2013.01); *F04B 53/12* (2013.01); *F04B 53/123* (2013.01); *F16K 15/021* (2013.01)

(58) Field of Classification Search
CPC ...... F04B 17/04; F04B 17/044; F04B 17/046; F04B 53/12; F04B 53/125; F16K 15/02; F16K 15/021; F16K 17/02
USPC .............. 417/416, 417, 552, 555.1, 560–562, 417/557; 137/528, 538
See application file for complete search history.

(56) References Cited

U.S. PATENT DOCUMENTS

| 2,761,392 | A | * | 9/1956 | Parker | .................. F04B 17/046 137/843 |
| 4,628,958 | A | * | 12/1986 | Miller | ...................... 137/512.15 |
| 7,150,606 | B2 | * | 12/2006 | Bonfardeci | ........... F04B 17/046 310/30 |
| 2013/0330221 | A1 | * | 12/2013 | Gaertner et al. | .............. 417/437 |

OTHER PUBLICATIONS

Author: Hollaus, D Title: Numerical Simulation of Eddy Currents Date Published: Sep. 2001 Date Accessed: Feb. 26, 2015 Website Link: http://www.asc.tuwien.ac.at/~khollaus/Thesis/PhDTheses.pdf.*
Company: Gotec Title: Electromagnetic Pumps Date Published: Sep. 2008 Date Accessed: Feb. 26, 2015 Website Link: http://www.gotecpumps.com/multimedia/docs/2008/08/111684_general_electromagnetic_pumps_leaflet.pdf.*
Company: Clark Solutions Title: Oscillating Piston Pumps Date Published: Feb. 15, 2008 Date Accessed: Mar. 9, 2015 Website Link: https://web.archive.org/web/20090215201532/http://clarksol.com/html/oscPistPump.cfm.*

* cited by examiner

*Primary Examiner* — Devon Kramer
*Assistant Examiner* — Chirag Jariwala
(74) *Attorney, Agent, or Firm* — Pearne & Gordon LLP

(57) ABSTRACT

An electromagnetic pump includes a coil configured to conduct an alternating current, a cylinder, and a piston assembly. The piston includes a cavity configured to receive fluid and an aperture defined in a first end thereof The piston is arranged within the cylinder to define an interface between the piston and the cylinder, and the piston is configured to move linearly between a first position and a second position within the cylinder. The piston is positioned in the electromagnetic pump such that it is within a magnetic field which is generated by the coil when the coil conducts a current.

20 Claims, 9 Drawing Sheets

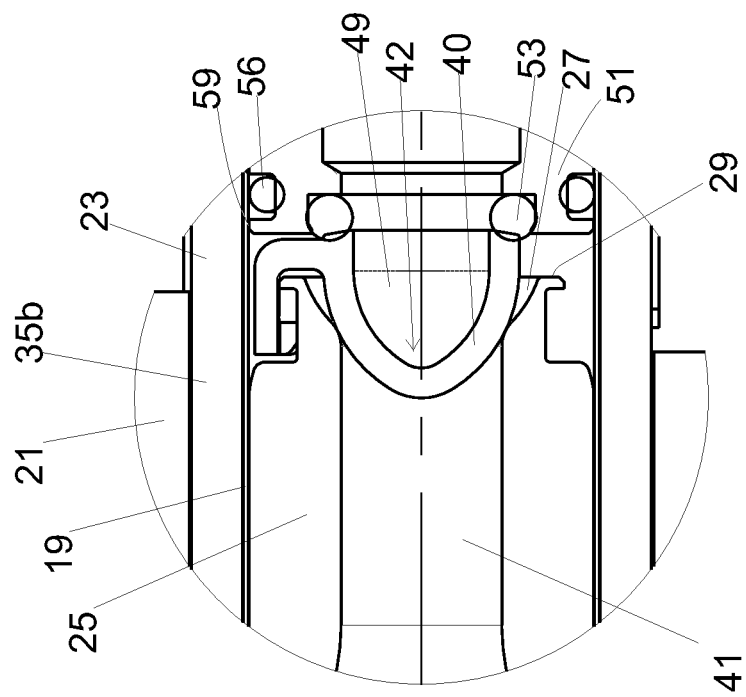
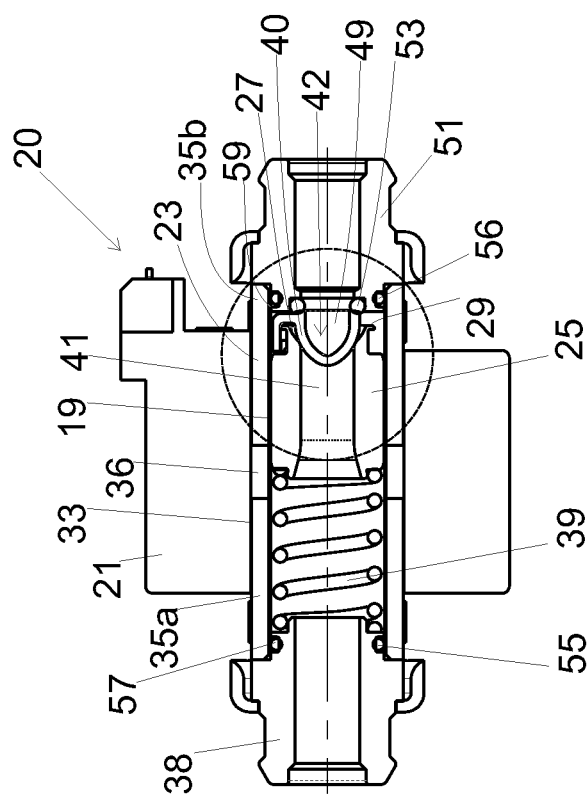
Fig.2b
Fig.2a

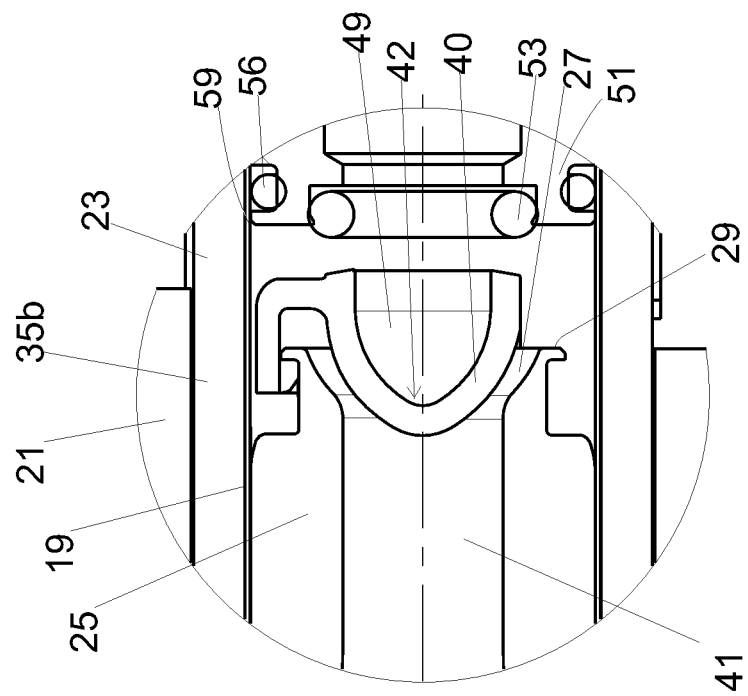
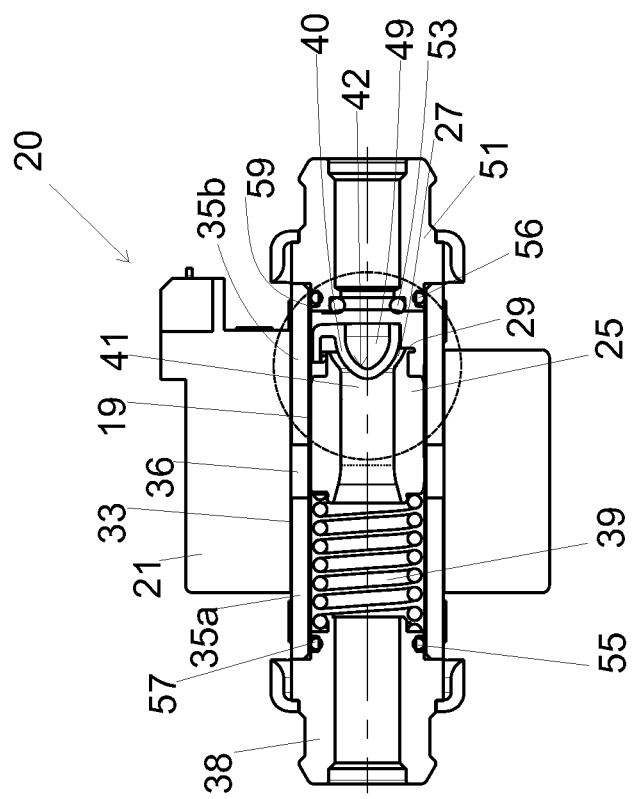
Fig.2d
Fig.2c

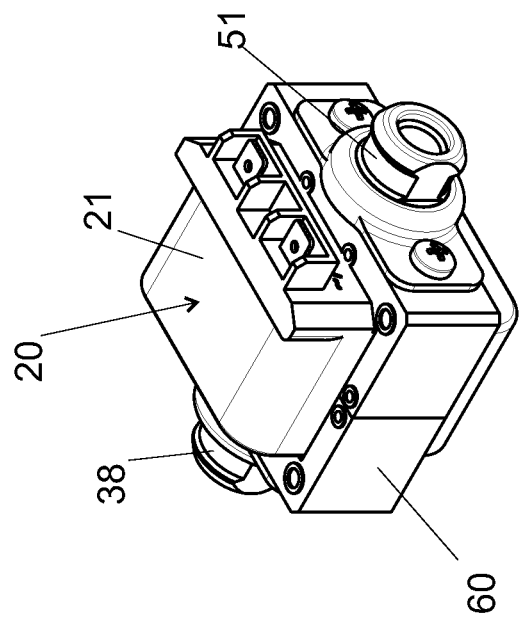
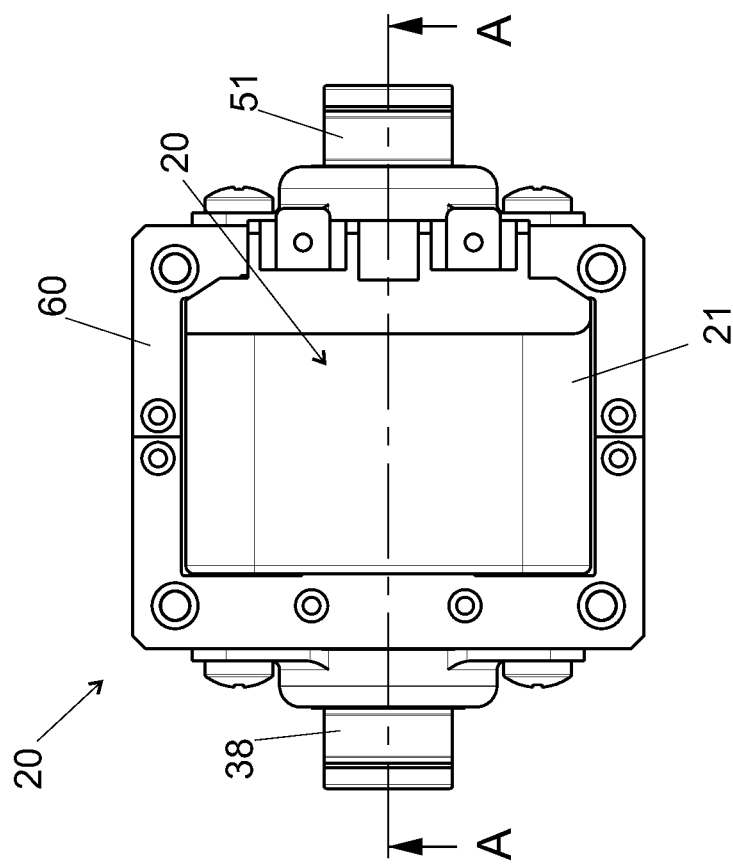

ELECTROMAGNETIC PUMP

The present application claims priority of U.S. application 61/622617, filed on Apr. 11, 2012, the contents of which is hereby enclosed by reference.

FIELD OF THE INVENTION

The present invention concerns an electromagnetic pump and in particular an electromagnetic pump which comprises a simplified valve.

DESCRIPTION OF RELATED ART

FIG. 1a provided a cross sectional view of an electromagnetic pump 100 according to the prior art and FIG. 1b provides a frontal view of the electromagnetic pump 100 shown in FIG. 1a.

The electromagnetic pump 100 comprises a cylinder 123 and piston 125 assembly.

The cylinder 123 comprises four parts; a first and a second ferromagnetic part 1230, a non magnetic portion 1231 which is interposed between the first and second ferromagnetic parts 1230, and a tube 171 within the components 1230 and 1231. The piston 125 is arranged within the tube 171 to define an interface between the piston 125 and cylinder 123. The piston 125 is arranged to move linearly within the tube 171 and within the cylinder 123, between a first position and second position. The piston 125 may be moved to its second position by a force which results from a magnetic field generated by a conduction coil 105 when the conduction coil 105 conducts current. The conduction coil 105 is located within a metallic frame 128. The piston 125 may be moved to its first position by a spring 139 which biases the piston 125 towards its first position.

The piston 125 further comprises an aperture 127 defined proximate to a first end 129 thereof. A chamber 141, which is suitable for receiving fluid, is also defined in the piston 125. Fluid to be pumped may be provided into a chamber 141 of the piston 125 via an input conduit 138 which is in fluid communication with the chamber 141.

The electromagnetic pump 100 comprises a system of valves 109 which can open and close to control the flow of fluid through the electromagnetic pump 100. A magnified view of the system of valves 109 is shown in FIG. 1c. The system of valves 109 is complex and comprises a plurality of cooperating parts; in particular the system of valves 109 comprises a first valve 115, an intermediate chamber 117, and a second valve 121. Each of the first and second valves 115, 121 comprise a plug member 151,153 and a spring 155,157. In each case the plug member 151,153 is attached to the spring 155,157.

The first valve 115 is operable to control the flow of fluid between the chamber 141 in the piston 125 and the intermediate chamber 117. When the piston 125 is in its first position the plug member 151 of the first valve 115 plugs the aperture 127 in the piston 125. FIGS. 1a and 1c show the piston 125 in its first position. When the piston 125 is in its second position, the piston 125 is removed from the plug member 151 so that the plug member 151 no longer plugs the aperture 127 and fluid can flow from the chamber 141 through the aperture 127 into the intermediate chamber 117. Alternately, when the piston 125 is in its second position, the piston 125 is moved away from intermediate chamber 117 so that the biasing force of the spring 155 on the plug member 151 is less than the force of the fluid flowing in the chamber 141 of the piston; in this case the fluid within the chamber 141 can push against the plug member 151 to move it out of the aperture 127 in the piston 125, so that fluid will flow through the aperture 127 and into the intermediate chamber 117. When the piston 125 is again moved to its first position, the plug member 151 plugs the aperture 127 once again to prevent the flow of fluid out of the chamber 141.

The second valve 121 is operable to control the flow of fluid between the intermediate chamber 117 and an output conduit 161. As the intermediate chamber 117 fills with fluid, pressure within the intermediate chamber 117 is increased. The fluid which fills the intermediate chamber 117 will push on the plug member 153 of the second valve 121, to move it against the biasing force of the spring 157; the fluid can then flow from the intermediate chamber 117 to the output conduit 161. Once the fluid has flown to the output conduit 161 pressure within the intermediate chamber will decrease and the plug 153 will be moved, by the recoil force of the compressed spring 157, back to its original position to close the second valve 121 once again. When the second valve 121 closes fluid is prevented from back-flowing from the output conduit 161 into the intermediate chamber 117 and into the interface between the tube 171 of cylinder 123 and the piston 125.

It is clear therefore the electromagnetic pumps 100 of the prior art require at least two valves for operation; a first valve 115 to control the flow of fluid through the aperture 127 in the piston 125, and a second valve 121 to prevent the fluid from back-flowing from the output conduit back into the electromagnetic pump 100 and into the interface between the piston 125 and the tube 171 of cylinder 123.

Disadvantageously, the system of valves 109 used in the electromagnetic pumps 100 of the prior art comprise many cooperating components: a first valve 115 with its plug member 151 and spring 155, an intermediate compression chamber 117 and a second valve 121 with its plug member 153 and spring 157; the requirement for so many components increases the complexity and cost of the prior art electromagnetic pumps 100.

Additionally, in order to achieve proper closing of the first and second valves 115,121, precise design and shaping of the plug members 151,153 is required: the plug members 151, 153 must precisely cooperate with the apertures which they are to plug, otherwise fluid will leak through the apertures when the valves 115,121 are closed. The requirement for precise design and shaping of the plug members 151,153 make the manufacturing process of the prior art electromagnetic pumps 100 expensive.

Furthermore, as can be seen in FIG. 1b, the electromagnetic pump 100 comprises a frame member 128, which provides structural support. Disadvantageously, a large amount of eddy currents can be generated in this frame member 128 when the electromagnetic pump 100 is in use.

It is an aim of the present invention to mitigate or obviate at least some of the aforementioned disadvantages.

BRIEF SUMMARY OF THE INVENTION

According to the present invention there is provided an electromagnetic pump comprising, a coil which can conduct an alternating current; a cylinder and a piston assembly, the piston having a cavity defined therein which is suitable to receive fluid and an aperture defined in a first end thereof, the piston being arranged within the cylinder to define an interface between the piston and cylinder, and wherein the piston is configured such that it can move linearly between a first position and second position, within the cylinder; wherein the piston is positioned in the electromagnetic pump such that it is within a magnetic field which is generated by the coil when the coil conducts a current, so that the magnetic field generated by the coil when the coil conducts current can force the piston to move towards its second position; a biasing means which is configured to bias the piston towards its first position; a seal; and a valve, wherein the valve comprises a single cap which is configured such that it can be moved between a first position and second position, wherein when the single cap is in its second position the single cap is positioned such as to allow fluid to pass through the aperture in the piston, and when the single cap is in its first position the single cap is arranged to fluidly seal the aperture in the piston to prevent the flow of fluid through the aperture and to abut the seal to prevent the flow of fluid from an outlet conduit of the electromagnetic pump to the interface between the piston and cylinder.

Advantageously, the valve provided in the electromagnetic pump of the present invention has a simple construction compared to the valves used in the prior art. In the electromagnetic pump of the present invention a single valve only is required to control the flow of fluid through the aperture in the piston, and to prevent fluid from back-flowing from on outlet conduit back into the electromagnetic pump and into the interface between the piston and cylinder. The single valve comprises a single cap and therefore advantageously has much less components compared to the valves used in the pumps of the prior art. The simplified construction and reduction in the number of parts leads to an electromagnetic pump which is easier and less costly to manufacture.

The cap may comprise two or more arms, wherein the two or more arms each cooperate with one or more tracks along which two or more arms can move so as to enable the cap to move between its first and second positions, wherein when the cap is in the second position the two or more arms remain in cooperation with the one or more tracks and spaces between the two or more arms define passages through which fluid from within the cavity of the piston can pass.

The two or more arms may each cooperate with a single track, wherein the single track is defined by an annular recess in an outer surface of the piston, and wherein each of the two or more arms comprise one or more projections which are arranged to project into the annular recess, and wherein the width of the one or more projection is less than the width of the annular recess such that the two or more arms can move linearly along the annular recess so as to enable the cap to move between its first and second positions.

Walls which define the annular recess may restrict the linear movement of the cap; when the cap is moved towards its second position, the one or more projections which are arranged to project into the annular recess will eventually abut the side walls defining the recess, thus preventing further linear movement of the cap. Thus, by selecting the appropriate width for the annular recess, and the appropriate width for the one or more projections, one can control the extent to which the cap can move and thus control the size of the passage which is provided for fluid to flow out of the cavity in the piston, when the cap is in its second position.

The cap is preferably configured to snap fit into the annular recess. For example, the cap may comprise plastic which will enable the arms of the cap to be elastically deformed so that the projections on the arms can be fit into the annular recess.

Instead of an annular recess; a cylindrical projection may be provided proximate to the aperture in the piston; the cylindrical projection may comprise one or more flanges; the outer surface of the cylindrical projection may define the single track.

The biasing means may be a spring.

Each of the two or more arms may comprise two projections. Each of the two or more arms may comprise a single projection.

The cap may comprise three arms.

The single cap may comprise a bowl-shape profile. The bowl-shape profile will ensure that when the piston is in its second position and the single cap is in its second position, the cap will offer less resistance to fluid flowing out of the cavity in the piston. Also the bowl-shape profile of the single cap will ensure that when the piston is in its first position and the single cap has been moved to its first position, then any back-flowing fluid which is flowing in the direction from the outlet conduit back toward the piston, will push against the single cap to cause the single cap to achieve a tighter closure of the aperture in the piston. As the bowl-shape profile of the single cap can take advantage of the pressure of the flowing fluid within the electromagnetic pump to achieve improved closure of the valve, less precise shaping and design of the single cap is required to achieve sufficient closure of the valve.

The bowl-shape profile of the cap may be such that when the cap is in its first position at least a part of the bowl-shape profile of the cap extends through the aperture provided in the piston.

The seal may comprise an O-ring. It will be understood that the seal may comprise any other type of annular rubber ring. The seal may be positioned between the single cap and an outlet conduit of the electromagnetic pump. The collaboration between the cap and the O-ring seal thus blocks the flow of fluid through the piston and around the piston when the piston is biased in its second position; a single valve is sufficient to fill both functions.

The electromagnetic pump may further comprise a second seal which is arranged to block the flow of fluid along an interface between the cylinder and an outlet part. The second seal may be an O-ring.

The electromagnetic pump may further comprise a third seal which is arranged to block the flow of fluid the cylinder and an inlet part. The third seal may be an O-ring.

The electromagnetic pump may further comprise a circuit with a diode which is configured to block the alternative current provided to the coil when this current flows in a first direction, and to let it pass when the current flows in the opposite direction, so as to reduce the frequency at which the piston moves between its first and second positions. The frequency at which the piston is moved between its first and second positions is proportional to the frequency of the alternating current, as the magnetic field generating by the coil which moves the piston is proportional to the frequency of the alternating current. The coil may conduct a alternating current which has a frequency of 50 Hz, generating 100 alternances each second and thus 100 moves of the piston. If the alternating current is conducted through a diode, the diode will cut half of the alternances, thus the frequency at which the piston is moved between its first and second positions is halved.

The coil may be arranged in direct contact with an outer surface of the cylinder.

The electromagnetic pump may further comprise ferromagnetic parts, for example a cylinder may comprise one or more ferromagnetic parts. Preferably, the cylinder comprises a first and second ferromagnetic part and an insulating part interposed between the first and second ferromagnetic parts. The insulating part may comprise plastic. The cylinder may comprise a laminate structure so as to reduce the occurrence of eddy currents.

The electromagnetic pump may further comprise a ferromagnetic frame member arranged to provide structural support and wherein the ferromagnetic frame member is a configured to be a laminate structure so as to reduce the occurrence of eddy currents.

It will be understood that the electromagnetic pump could be used in many applications. For example, according to a further aspect of the present invention there is provided a coffee making machine comprising an electromagnetic pump according to any one of the above-mentioned electromagnetic pumps.

According to a further aspect of the present invention there is provided a soil cleaning machine comprising an electromagnetic pump according to any one of the above-mentioned electromagnetic pumps.

It will be understood that the electromagnetic pump could have many applications. For example, there may be provided an air-conditioning apparatus comprising any one of the above-mentioned electromagnetic pumps. In a further application, the electromagnetic pump may be arranged to pump oil or fuel.

BRIEF DESCRIPTION OF THE DRAWINGS

The invention will be better understood with the aid of the description of an embodiment, which is given by way of example only, and illustrated by the figures, in which:

FIG. 1b provides a frontal view of the electromagnetic pump shown in FIG. 1a;

FIG. 1c provides a magnified view of the valve system in the electromagnetic pump of FIG. 1a;

FIG. 2a provides cross sectional view of an electromagnetic pump according to one embodiment of the present invention, with the piston shown in its first (closed) position;

FIG. 2b provides a magnified view of the valve used in the electromagnetic pump shown in FIG. 2a;

FIG. 2c provides cross sectional view of an electromagnetic pump according to the same embodiment shown in FIGS. 2a and b, but with the piston shown in its second (open) position;

FIG. 2d provides a magnified view of the valve in the electromagnetic pump shown in FIG. 2c;

FIG. 3 provides a side view of a the electromagnetic pump shown in FIGS. 2a-d;

FIG. 4 provides a perspective view of a the electromagnetic pump shown in FIGS. 2a-d;

DETAILED DESCRIPTION OF POSSIBLE EMBODIMENTS OF THE INVENTION

Figure 1A:
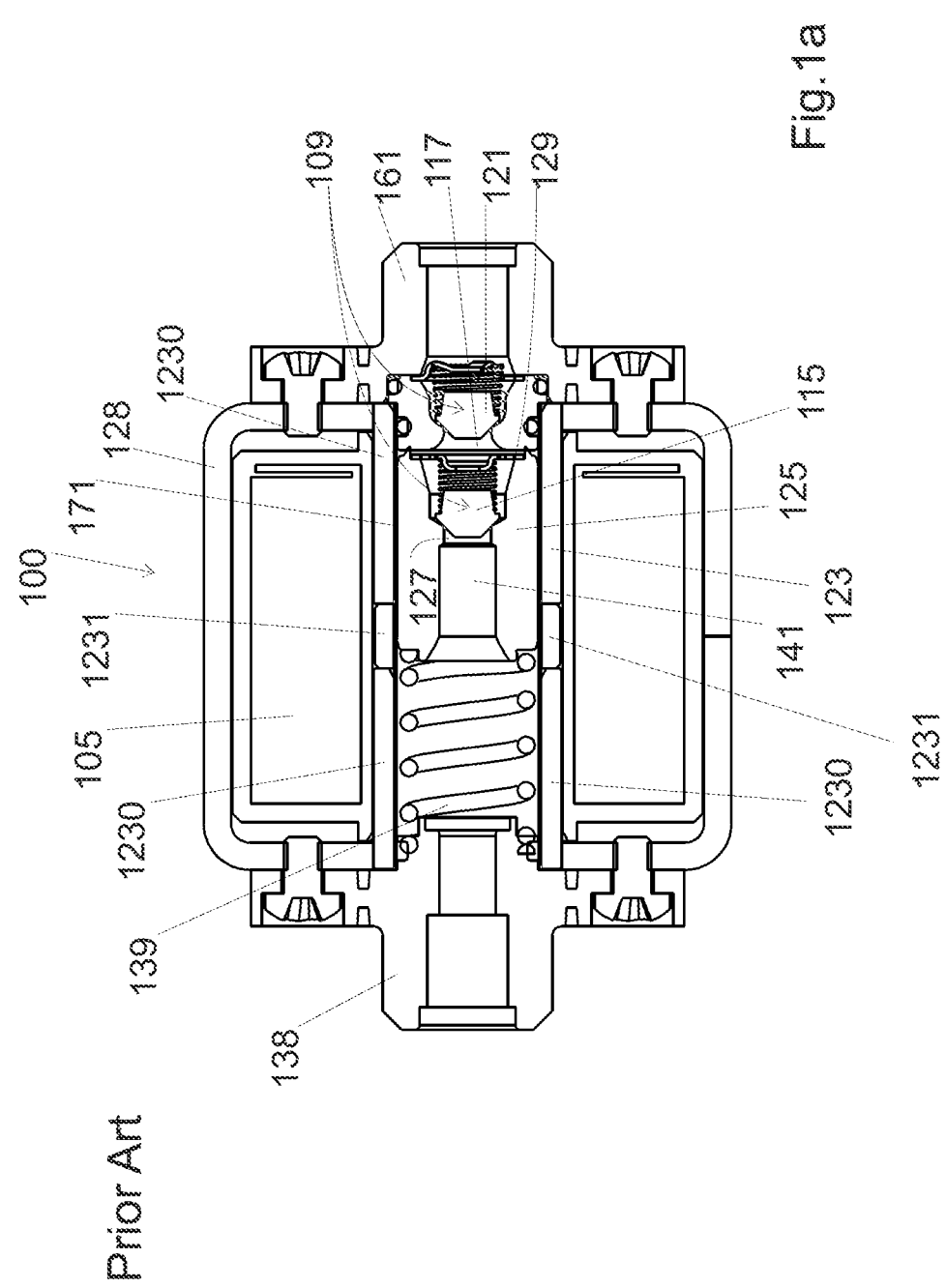
FIG. 1a provided a cross sectional view of an electromagnetic pump according to the prior art.
Figure 1C:
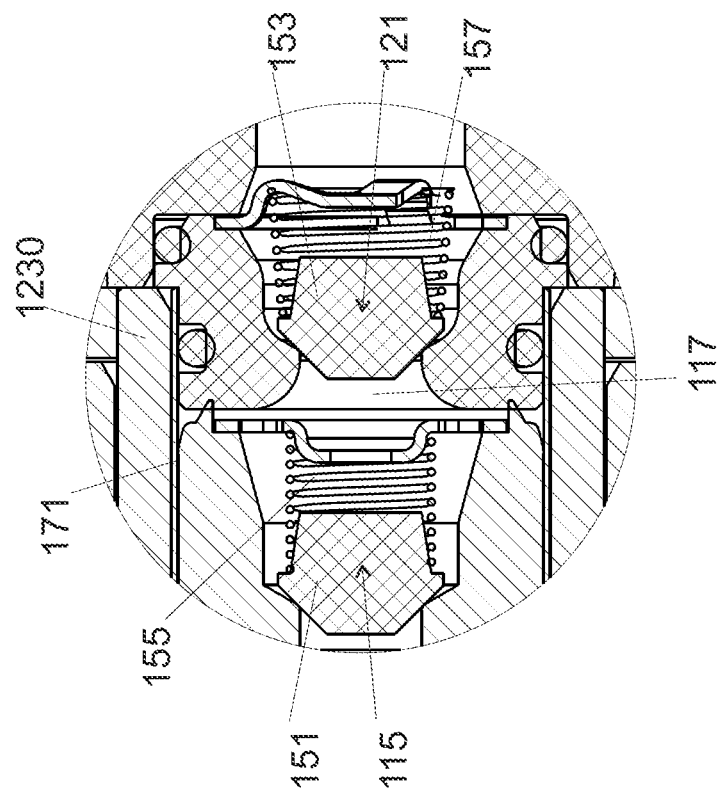
Figure 1B:
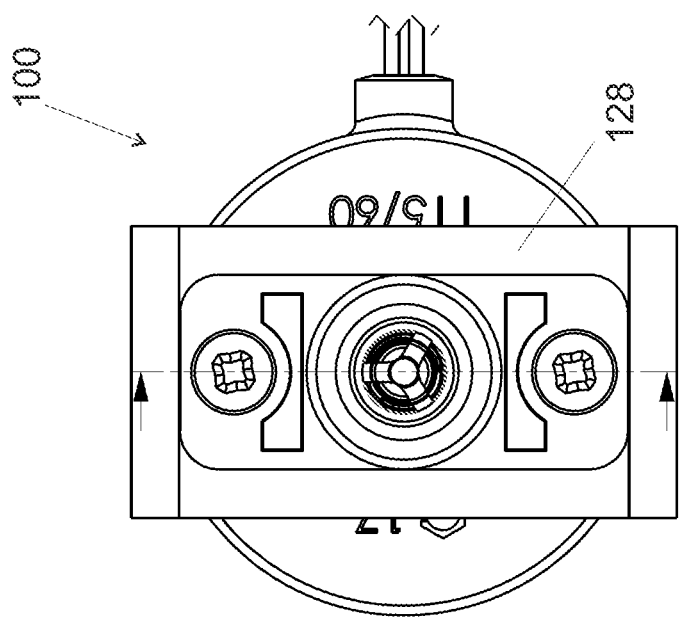

FIGS. 2a and 2c each provide a cross sectional view of an electromagnetic pump 20 according to one embodiment of the present invention. FIG. 2b provides a magnified view of the valve used in the electromagnetic pump 20 shown in FIG. 2a and FIG. 2d provides a magnified view of the valve in the electromagnetic pump 20 shown in FIG. 2c.

The electromagnetic pump 20 comprises a cylinder 23 and a piston 25 assembly. The cylinder 23 comprises four parts; a first and second ferromagnetic part 35a,b, a non magnetic portion 36 which is interposed between the first and second ferromagnetic parts 35a,b, and a tube 19 within the components 35a, 35b and 36.

The piston 25 comprises a chamber 41 defined therein which is suitable for receiving fluid. The chamber 41 is arranged in fluid communication with an inlet conduit 38. The piston 25 further comprises an aperture 27 defined in a first end 29 thereof. The piston 25 is arranged to extend within the cylinder 23 and is configured such that it can move linearly between a first position and second position, within the cylinder 23. FIG. 2a shows the piston 25 in its first position while FIG. 2c shows the piston 25 in its second position. An interface is defined between the piston 25 and the tube 19 within the cylinder 23.

A biasing means, in the form of a spring 39, is arranged within the electromagnetic pump 20 so as to bias the piston 25 towards its first position (as shown in FIG. 2a).

A coil 21 is arranged in direct contact with an outer surface 33 of cylinder 23 and is arranged such that a magnetic field generated by the coil 21 when it conducts a current can cooperate with the piston 25 to move the piston towards its second position (as shown in FIG. 2c). The coil 21 may be composed of any suitable electrically conducting material, for example copper.

A single valve 42 is provided in the electromagnetic pump 20. The single valve 42 comprises a single cap 40 which is arranged to cooperate with the piston 25 at the first end 29 of the piston 25. The single cap 40 is moveable between a first position and second position to selectively close and open, respectively, the aperture 27 which is defined in the first end 29 of the piston 25. FIG. 2a illustrates the single cap 40 in its first position in which the single cap 40 closes the aperture 27 which is defined in the first end 29 of the piston 25; FIG. 2c illustrates the single cap 40 in its second position wherein fluid can pass through the aperture 27 in the piston 25. When the single cap 40 is in its second position fluid will pass through an inlet conduit 38, into the chamber 41 in the piston 25, and through the aperture 27. Once the fluid has passed through the aperture 27 it then passes to an outlet conduit 51.

The single cap 40 comprises a bowl-shape profile. The bowl-shape profile of the single cap 40 is such that when the single cap 40 is in its first position the single cap 40 extends into the chamber 41 in the piston 25. The bowl-shape profile defines a receptacle 49 which can receive fluid which has flowed through the aperture 27 in the piston 25.

The electromagnetic pump 20 further comprises a seal, here for example in the form of a first O-ring 53. The O-ring 53 is positioned within the electromagnetic pump 20, between the outlet conduit 51 and the piston 25, such that when the piston 25 is in its first position, the force of the spring 39 acting on the piston 25 pushes the piston 25 which in turn pushes the single cap 40 so that it abuts the O-ring 53. The cooperation between the single cap 40 and the O-ring 53 prevents the back-flow of fluid from the outlet conduit 51, backwards, into the interface between the piston 25 and the tube 19 within cylinder 23. Thus, moving the piston 25 to its first position moves the single cap to its first position to close the aperture 29 in the piston 25 and to abut the O-ring 53; then both the forward flow of fluid through the electromagnetic pump 20 and the back-flow of fluid through the electromagnetic pump 20 is prevented.

A second O-ring 55 is provided at an interface 57 between the cylinder 23 and an inlet conduit 38. A third O-ring 56 is provided at an interface 59 between the cylinder 23 and an outlet conduit 51. The second and third O-rings 55, 56 prevent the flow of fluid between the cylinder 23 and respective inlet and outlet conduits 38, 51.

A pressurizing means (not shown) may be arranged in cooperation with the outlet conduit 51, to pressurize fluid which has flowed out of the piston 25.

Referring now to FIGS. 3 and 4. FIG. 3 provides a side view of the electromagnetic pump 20 shown in FIGS. 2a-d; FIG. 4 provides a perspective view of the electromagnetic pump 20 shown in FIGS. 2a-d. As shown in FIGS. 3 and 4, the ferromagnetic components 35a, 35b of the cylinder are parts of a ferromagnetic frame 60; the ferromagnetic frame 60 comprises three legs; two legs surround the coil 21, cylinder 23 and piston 25 and one leg extends through the coil, the ferromagnetic frame 60 provides structural support to these components. The ferromagnetic frame 60 is configured to be a laminate structure so as to reduce the occurrence of eddy currents when the coil 21 conducts current.

Figure 5A:
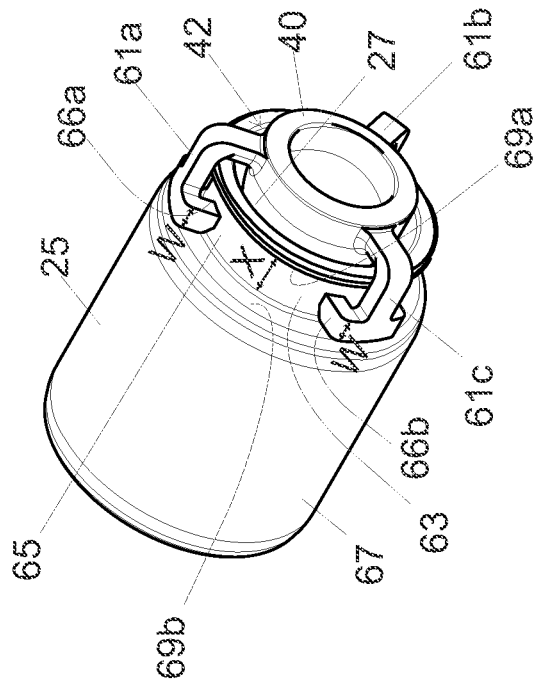
FIG. 5a provides a perspective view of the piston and valve, used in the electromagnetic pump shown in FIGS. 2a-d, when in its open position.
Figure 5B:
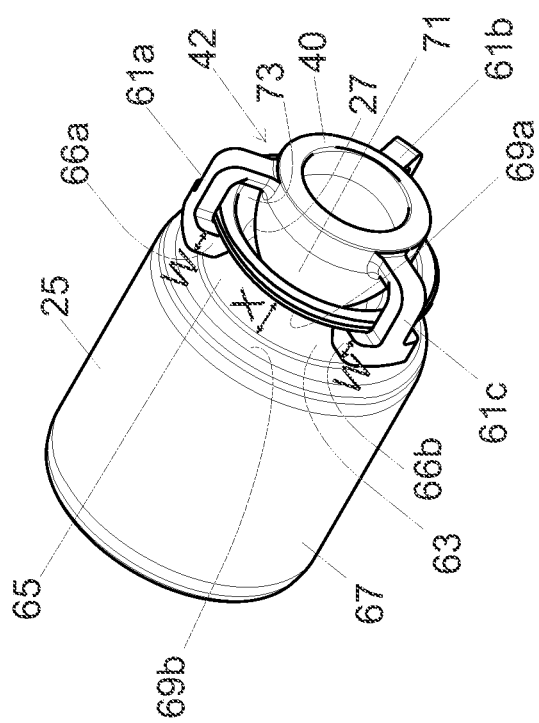
FIG. 5b provides a perspective view of the piston and valve, used in the electromagnetic pump shown in FIGS. 2a-d, when in its closed position.
Figure 5C:
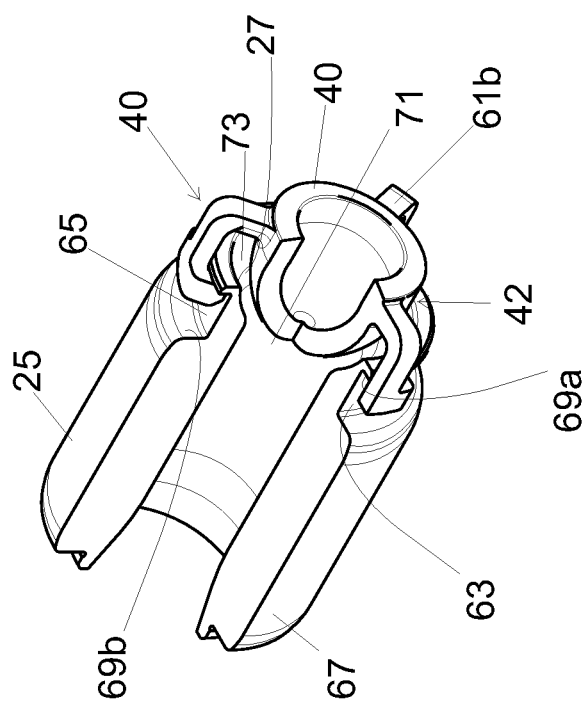
FIG. 5c provides a cut-out view of the piston and valve provided in the electromagnetic pump shown in FIGS. 2a-d.

Referring to FIGS. 5a,b and c. FIG. 5a provides a perspective view of the piston 25 and the single cap 40 which defines the single valve 42, used in the electromagnetic pump 20 shown in FIGS. 2a-d, 3 and 4. FIG. 5a illustrates the single cap 40 in its second position, wherein fluid can pass through the aperture 27 in the piston 25. FIG. 5b also provides a perspective view of the piston 25 and the single cap 40 which defines the single valve 42, used in the electromagnetic pump 20 shown in FIGS. 2a-d, 3 and 4. FIG. 5b illustrates the single cap 40 in its first position wherein the single cap 40 closes the aperture 27 which is defined in the first end 29 of the piston 25. FIG. 5c provides a cut-out view of the piston 25 and the single cap 40 provided in the electromagnetic pump 20 shown in FIGS. 2a-d, 3 and 4.

As shown in FIGS. 5a,b and c, the single cap 40 comprises three arms 61a-c wherein each of the three arms 61a-c cooperate with a single track/groove 63. In this embodiment the single track 63 is defined by an annular recess 65 in an outer surface 67 of the piston 25. Each of the three arms 61a-c comprise two projections 66a,b which are arranged to project into the annular recess 65, and wherein the width 'w' of each of the two projections 66a,b is less than the width 'x' of the annular recess 65 such that the three arms 61a-c can move linearly along the annular recess 65 so as to allow the cap 40 to move between its first and second positions. Walls 69a,b which define the annular recess 65 will restrict the linear movement of the cap 40; when the cap 40 is moved towards its second position the projections 66a,b which project into the annular recess 65 will eventually abut the side wall 69a which defines the annular recess 65, thus preventing further linear movement of the cap 40. When the projections 66a,b abut the side wall 69a then the cap 40 is in its second position. When the cap 40 is in the second position the three arms 61a-c remain in cooperation with the single tracks 63 and spacing's 71 between each of the three arms 61a-c define a passage through which fluid flow from within the chamber 41 of the piston 25 can pass. By selecting the appropriate width 'x' for the annular recess 65, and the appropriate width 'w' for the projections 66a,b, one can control the extent to which the cap 40 can linearly move before it reaches its second position.

When the single cap 40 is moved towards its first position the projections 66a,b which project into the annular recess 65 will eventually abut the opposite side wall 69b which defines the annular recess 65. The arms 61a-c and the bowl-shape profile of the cap 40 are configured such that the cap 40 will cooperate with a wall 73 of the piston 25 which defines the aperture 27, to fluidly seal the aperture 27, when the projections 66a,b abut or almost abut the opposite side wall 69b. When the cap 40 has been moved to fluidly seal the aperture 27 and the projections 66a,b abut or almost abut the opposite side wall 69b then the cap 40 is in its first position.

The single cap 40 is preferably configured to snap fit into the annular recess 65. For example, the cap 40 may be composed of plastic which will enable the arms 61a-c of the cap 40 to be elastically deformed so that the projections 66a,b on the arms 61a-c can be fit into the annular recess 65.

In this embodiment, as the track 63 is an annular recess 65 the single cap 40 is also free to rotate. For an embodiment in which the cap 40 is prevented from rotating, a longitudinal track extending parallel to a longitudinal axis of the piston 25 could be provided for each arm 61a-c. It will also be understood that instead of providing an annular recess 65 in an outer surface 67 of the cylinder 23, a cylindrical projection comprising a flange at one end, may equally be used to provide the single track 63. It will also be understood that the cap 40 is not limited to having three arms 61a-c; the cap 40 may comprise any number of arms.

Figure 6B:
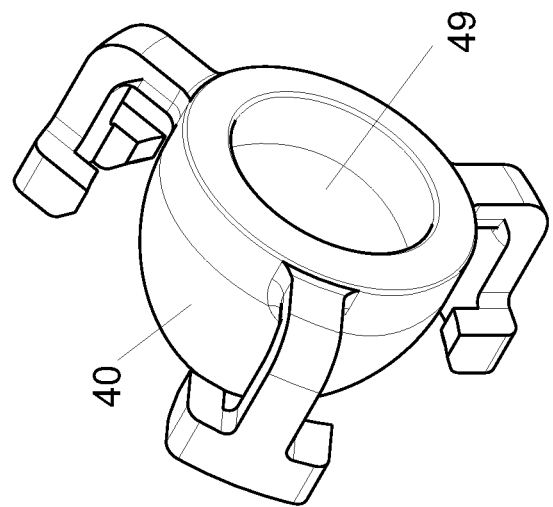
FIGS. 6a and 6b provide a perspective view of a cap which can used in the valve which is provided in the electromagnetic pump shown in FIGS. 2a-d.
Figure 6A:
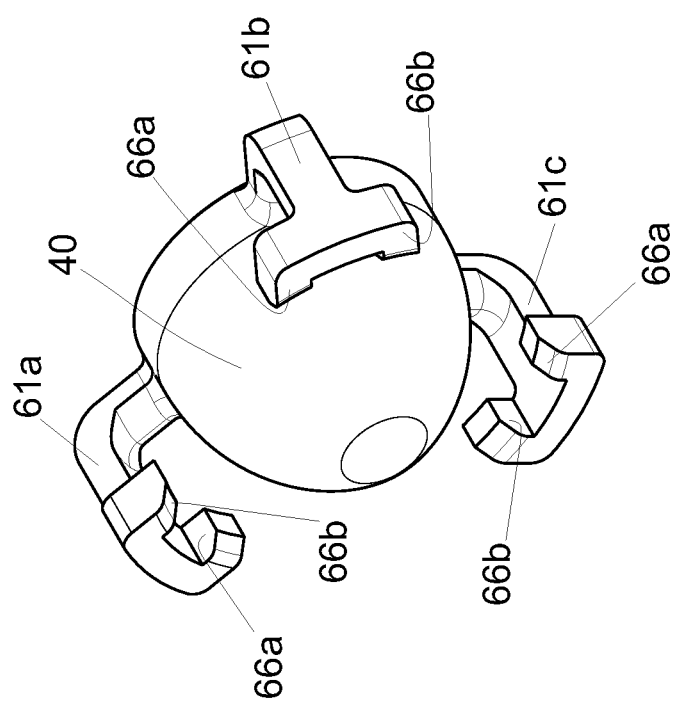

FIGS. 6a and 6b provide a perspective view of the single cap 40 which is used in the electromagnetic pump 20 shown in FIGS. 2a-d, 3, 4, and 5a-c.

Figure 7B:
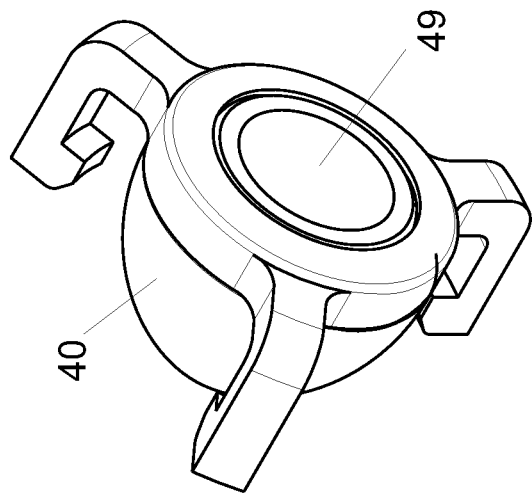
FIGS. 7a and 7b provide a perspective view of another cap embodiment which can be used in the valve which is provided in the electromagnetic pump shown in FIGS. 2a-d.
Figure 7A:
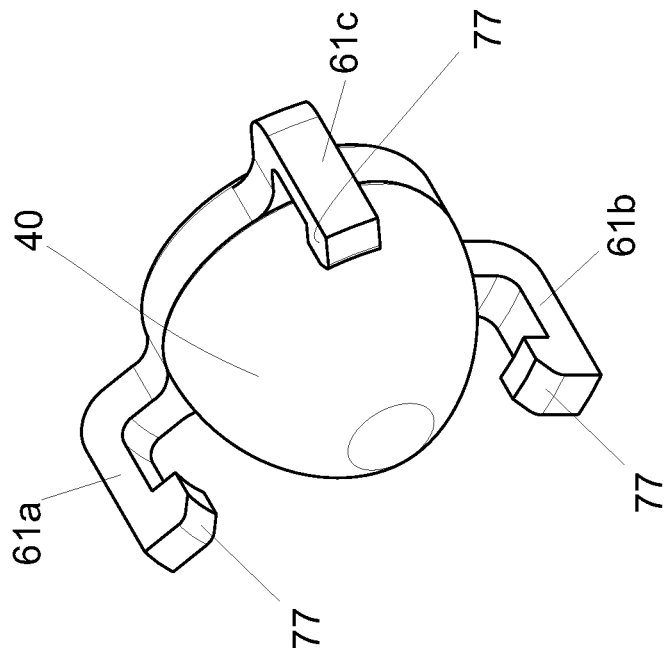

The three arms 61a-c of the single cap 40, the cap's bowl-shape profile, and the receptacle 49, defined by the single cap 40, are all shown in the FIGS. 6a and 6b. In the embodiment shown in FIGS. 6a and 6b two projections 66a,b are provided on each arm 61a-c. As previously described with reference to FIGS. 5a, 5b and 5c these projections 66a,b will project into the annular recess 65 provided on the outer surface 67 of the piston 25. However, it will be understood that any number of projections may be provided. For example, as shown in FIGS. 7a and 7b, each arm 61a-c may be provided with a single projection 77. Furthermore, the receptacle 49 defined by the cap 40 may have any suitable volume; the volume of the receptacle 49 defined by the cap 40 shown in FIGS. 6a and 6b is larger than the volume of the receptacle 49 defined by the cap 40 shown in FIGS. 7a and 7b.

During use of the electromagnetic pump 20 a current (preferably an AC current) is passed through the coil 21; this generates a magnetic field. The magnetic field applies a force to the piston 25 to move the piston 23 towards its second position. As the piston 23 is moved to it second position the spring 39 is compressed. Once the piston 25 has been moved to its second position fluid is passed into the chamber 41 of the piston 25 via the inlet conduit 38. The pressure of the incoming fluid pushes the single cap 40 to move the single cap 40 to its second position (as shown in FIGS. 2c and 2d). The single cap 40 moves towards its second position until the projections 66a,b on each arm 61a-c abut the side wall 69a defining the annular recess 65. Once the projections 66a,b abut the side wall 69a defining the annular recess 65, the single cap 40 is in its second position (i.e. the valve is open). Once single cap 20 is moved to its second position fluid can pass out of the chamber 41 through the aperture 27 in the piston 25. The fluid which has passed through the aperture 27 is then dispensed through the outlet conduit 51.

To stop the flow of fluid through the electromagnetic pump 20 the current conducted in the coil 21 is brought towards a zero amplitude. The magnetic field generated by the coil 21 approaches zero as the current conducted in the coil 21 is brought towards a zero amplitude; thus the force applied to the piston 25 by the generated magnetic field approaches zero. Once the force applied to the piston 25 by the magnetic field is less than the recoil force of the compressed spring 39, then the spring 39 begins to push the piston 25 towards its first position (as shown in FIGS. 2a and 2b). As the piston 25 moves towards its first position it will eventually abut the single cap 40; once it abuts the single cap 40 the piston 25 will push the single cap 40 towards the O-ring 53 as the piston 25 continues to move towards its first position. The piston 25 will push the cap 40 until it abuts the O-ring 53, at which point the O-ring 53 will prevent further movement of the piston 25 and cap 40. When the cap 40 abuts the O-ring 53, the cap will be moved to its first position wherein the cap plugs aperture 27 defined in the first end 29 of the piston 25 to prevent the flow of fluid through the aperture 27 (in this position the single cap 40 will prevent both the flow of fluid out of the chamber 41 of the piston 25 and will also prevent the backflow of fluid from the outlet conduit 51 into the chamber 41 of the piston 25). Additionally, the recoil force of the spring 39 acting on the piston 25 will ensure that the piston 25 maintains a force on the single cap 40 so as to keep the single cap 40 abutting the O-ring 53. The cooperation between the single cap 40 and the O-ring 53 will prevent the flow of fluid from the outlet conduit 51 to the interface between the piston 25 and cylinder 23.

It will be understood that the electromagnetic pump 20 has many different applications. For example, the electromagnetic pump 20 may be provided in a soil cleaning machine; in a coffee making machine; in an air-conditioning apparatus to pump water or a cooling liquid; or may be arranged in a device to pump oil or fuel.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

For example, optionally, a diode (not shown) may be electrically connected to the coil 21; the diode may be operable to modify the current conducted in the coil 21 so as to modify the magnetic field generated and thus modify the frequency at which the piston 25 is moved between its first and second positions.

For example, if the coil 21 conducts an alternating sinusoidal current which has a frequency of 50 Hz; this will result in an alternating magnetic field with a frequency of 50 Hz, and 100 alternances each second. A diode can be used to half the number of alternances of the current through the coil, thus halving the frequency at which the piston 25 is moved to its second position. It will be understood that any other suitable electrical circuitry may be used to achieve any desired movement profile for the piston 25.

The invention claimed is:

1. An electromagnetic pump comprising:
a coil configured to conduct an alternating current;
a cylinder;
a piston, the piston comprising a cavity configured to receive fluid and an aperture defined in a first end thereof, the piston being arranged within the cylinder to define an interface between the piston and the cylinder, wherein the piston is configured to move linearly between a first piston position and a second piston position within the cylinder, and wherein the piston is positioned in the electromagnetic pump within a magnetic field generated by the coil when the coil conducts the current, wherein the magnetic field generated by the coil when the coil conducts the current forces the piston to move towards the second piston position;
a biasing means configured to bias the piston towards the first piston position;
a seal; and
a single valve only, wherein the single valve comprises a single cap only configured to move between a first cap position and a second cap position, wherein when the single cap is in the second cap position, the single cap is positioned to allow fluid to pass through the aperture in the piston, and when the single cap is in the first cap position, the single cap is arranged to fluidly seal the aperture in the piston to prevent a flow of fluid through the aperture and to abut the seal to prevent a flow of fluid from an outlet conduit of the electromagnetic pump to the interface between the piston and the cylinder.

2. The electromagnetic pump according to claim 1, wherein the single cap is arranged to cooperate with the piston such that when the piston is moved to the first piston position, the piston moves the single cap into the first cap position.

3. The electromagnetic pump according to claim 1, wherein the outlet conduit is arranged to receive fluid which has flowed through the aperture in the piston.

4. The electromagnetic pump according to claim 1, wherein the single cap comprises two or more arms, wherein the two or more arms each cooperates with one or more tracks along which the two or more arms can move so as to enable the cap to move between the first cap position and the second cap position, wherein when the cap is in the second cap position, the two or more arms remain in cooperation with the one or more tracks, and spaces between the two or more arms define passages through which fluid from within the cavity of the piston can pass.

5. The electromagnetic pump according to claim 4, wherein the two or more arms each cooperates with a single track, wherein the single track is defined by an annular recess in an outer surface of the piston, and wherein each of the two or more arms comprises one or more projections which are arranged to project into the annular recess, and wherein a width of the one or more projections is less than a width of the annular recess such that the two or more arms can move linearly along the annular recess to enable the single cap to move between the first cap position and the second cap position.

6. The electromagnetic pump according to claim 5, wherein each of the two or more arms comprises two projections.

7. The electromagnetic pump according to claim 1, wherein the single cap comprises three arms.

8. The electromagnetic pump according to claim 1, wherein the single cap comprises a bowl-shape profile.

9. The electromagnetic pump according to claim 8, wherein the bowl-shape profile of the single cap is such that when the single cap is in the first cap position, at least a part of the bowl-shape profile of the cap extends through the aperture in the piston.

10. The electromagnetic pump according to claim 1, wherein the electromagnetic pump further comprises an O-ring arranged to block a flow of fluid along an interface between the cylinder and the outlet conduit.

11. The electromagnetic pump according to claim 1, wherein the electromagnetic pump further comprises an O-ring arranged to block a flow of fluid between the cylinder and an inlet conduit.

12. The electromagnetic pump according to claim 1, wherein the electromagnetic pump further comprises a circuit with a diode arranged for reducing a frequency at which the piston moves between the first piston position and the second piston position.

13. The electromagnetic pump according to claim 1, wherein the coil is arranged in direct contact with an outer surface of the cylinder.

14. The electromagnetic pump according to claim 1, wherein the electromagnetic pump further comprises a ferromagnetic frame arranged to provide structural support to the electromagnetic pump and wherein the ferromagnetic frame is configured to be a laminate structure so as to reduce occurrence of eddy currents.

15. A soil cleaning machine comprising the electromagnetic pump according to claim 1.

16. The electromagnetic pump according to claim 1, wherein the seal is arranged between the single cap and the outlet conduit and contacts both the single cap and the outlet conduit when the single cap is in the first cap position.

17. The electromagnetic pump according to claim 1, wherein the single valve is the only valve and wherein the single cap is the only cap of the electromagnetic pump configured to allow fluid to pass through the aperture in the piston and to fluidly seal the aperture in the piston to prevent the flow of fluid through the aperture.

18. An electromagnetic pump comprising:
a coil configured to conduct an alternating current;
a cylinder;
a piston, the piston comprising a cavity configured to receive fluid and an aperture defined in a first end thereof, the piston being arranged within the cylinder to define an interface between the piston and the cylinder, wherein the piston is configured to move linearly between a first piston position and a second piston position within the cylinder, and wherein the piston is positioned in the electromagnetic pump within a magnetic field generated by the coil when the coil conducts the current, wherein the magnetic field generated by the coil when the coil conducts the current forces the piston to move towards the second piston position;
a biasing means configured to bias the piston towards the first piston position;
a seal; and
a single valve only, wherein the single valve comprises a single cap only configured to move between a first cap position and a second cap position, wherein when the single cap is in the second cap position, the single cap is positioned to allow fluid to pass through the aperture in the piston, and when the single cap is in the first cap position, the single cap is arranged to fluidly seal the aperture in the piston to prevent a flow of fluid through the aperture and to abut the seal to prevent a flow of fluid from an outlet conduit of the electromagnetic pump to the interface between the piston and the cylinder, wherein the single cap comprises two or more arms, wherein the two or more arms each cooperates with one or more tracks defined in a surface of the piston along which the two or more arms are configured to move to enable the cap to move between the first cap position and the second cap position, wherein when the cap is in the second cap position, the two or more arms remain in cooperation with the one or more tracks and wherein spaces between the two or more arms define passages through which fluid from within the cavity of the piston can pass.

19. An electromagnetic pump comprising:
a coil configured to conduct an alternating current;
a cylinder;
a piston, the piston comprising a cavity configured to receive fluid and an aperture defined in a first end thereof, the piston being arranged within the cylinder to define an interface between the piston and the cylinder, wherein the piston is configured to move linearly between a first piston position and second piston position within the cylinder; and wherein the piston is positioned in the electromagnetic pump within a magnetic field generated by the coil when the coil conducts the current, wherein the magnetic field generated by the coil when the coil conducts current forces the piston to move towards the second piston position;
a biasing means configured to bias the piston towards the first piston position;
a seal; and
a single valve only, wherein the single valve comprises a single cap only configured to move between a first cap position and a second cap position, wherein when the single cap is in the second cap position, the single cap is positioned to allow fluid to pass through the aperture in the piston, and when the single cap is in the first cap position, the single cap is arranged to fluidly seal the aperture in the piston to prevent a flow of fluid through the aperture and to abut the seal to prevent a flow of fluid from an outlet conduit of the electromagnetic pump to the interface between the piston and the cylinder, and wherein the single cap is snap-fitted to the piston.

20. An electromagnetic pump comprising:
a coil which can conduct an alternating current;
a cylinder and a piston assembly, the piston having a cavity defined therein which is suitable to receive fluid and an aperture defined in a first end thereof, the piston being arranged within the cylinder to define an interface between the piston and cylinder, and wherein the piston is configured such that it can move linearly between a first position and second position, within the cylinder,
wherein the piston is positioned in the electromagnetic pump such that it is within a magnetic field which is generated by the coil when the coil conducts a current, so that the magnetic field generated by the coil when the coil conducts current can force the piston to move towards its second position;
a biasing means which is configured to bias the piston towards its first position;
a seal; and
a single valve only, wherein the single valve comprises a single cap only which is configured such that it can be moved between a first position and second position, wherein when the single cap is in its second position the single cap is positioned such as to allow fluid to pass through the aperture in the piston, and when the single cap is in its first position the single cap is arranged to fluidly seal the aperture in the piston to prevent the flow of fluid through the aperture and to abut the seal to prevent the flow of fluid from an outlet conduit of the electromagnetic pump to the interface between the piston and cylinder,
wherein the single cap further comprises two or more arms each of which comprises one or more projections, and wherein the single cap is arranged such that the one or more projections are retained behind an annular lip on the piston.

* * * * *